United States Patent [19]

Drako et al.

[11] Patent Number: 5,428,775
[45] Date of Patent: Jun. 27, 1995

[54] APPARATUS FOR PROVIDING DATA DEPENDENT WRITE OPERATIONS

[75] Inventors: Dean M. Drako, Cupertino; Steven Roskowski, Sunnyvale, both of Calif.

[73] Assignee: Apple Computer, Inc., Cupertino, Calif.

[21] Appl. No.: 126,104

[22] Filed: Sep. 22, 1993

Related U.S. Application Data

[63] Continuation of Ser. No. 528,217, May 24, 1990, abandoned.

[51] Int. Cl.⁶ ............................................. G06F 9/00
[52] U.S. Cl. ............................ 395/600; 364/222.82; 364/252.5; 364/252.6; 364/255.4; 364/DIG. 1
[58] Field of Search ...................... 395/600, 650, 700

[56] References Cited

U.S. PATENT DOCUMENTS

| | | | |
|---|---|---|---|
| 4,520,439 | 5/1985 | Liepa | 395/425 |
| 4,769,818 | 9/1988 | Mortimer | 371/37.4 |
| 4,874,164 | 10/1989 | Miner et al. | 340/720 |
| 4,958,378 | 9/1990 | Bell | 340/721 |
| 5,003,539 | 3/1991 | Takemoto et al. | 371/37 |
| 5,063,448 | 11/1991 | Jaffray et al. | 358/160 |
| 5,079,545 | 1/1992 | Priem et al. | 395/134 |
| 5,091,967 | 2/1992 | Ohsawa | 382/22 |
| 5,103,499 | 4/1992 | Miner et al. | 395/162 |
| 5,216,413 | 6/1993 | Seiler et al. | 395/164 |

*Primary Examiner*—Kevin A. Kriess
*Assistant Examiner*—John Q. Chavis
*Attorney, Agent, or Firm*—Blakely, Sokoloff, Taylor & Zafman

[57] ABSTRACT

In a computer system which includes devices capable of writing data and generating addresses to which such data is to be written, a device to which data is directed, and address, data, and control lines connecting the devices capable of writing data and generating addresses to the device to which data is directed, apparatus for placing control signals in unused bit positions of data words, apparatus for sensing the control signals placed in the data words, and apparatus responsive to the control signals placed in the data words for modifying the use made of the data.

24 Claims, 4 Drawing Sheets

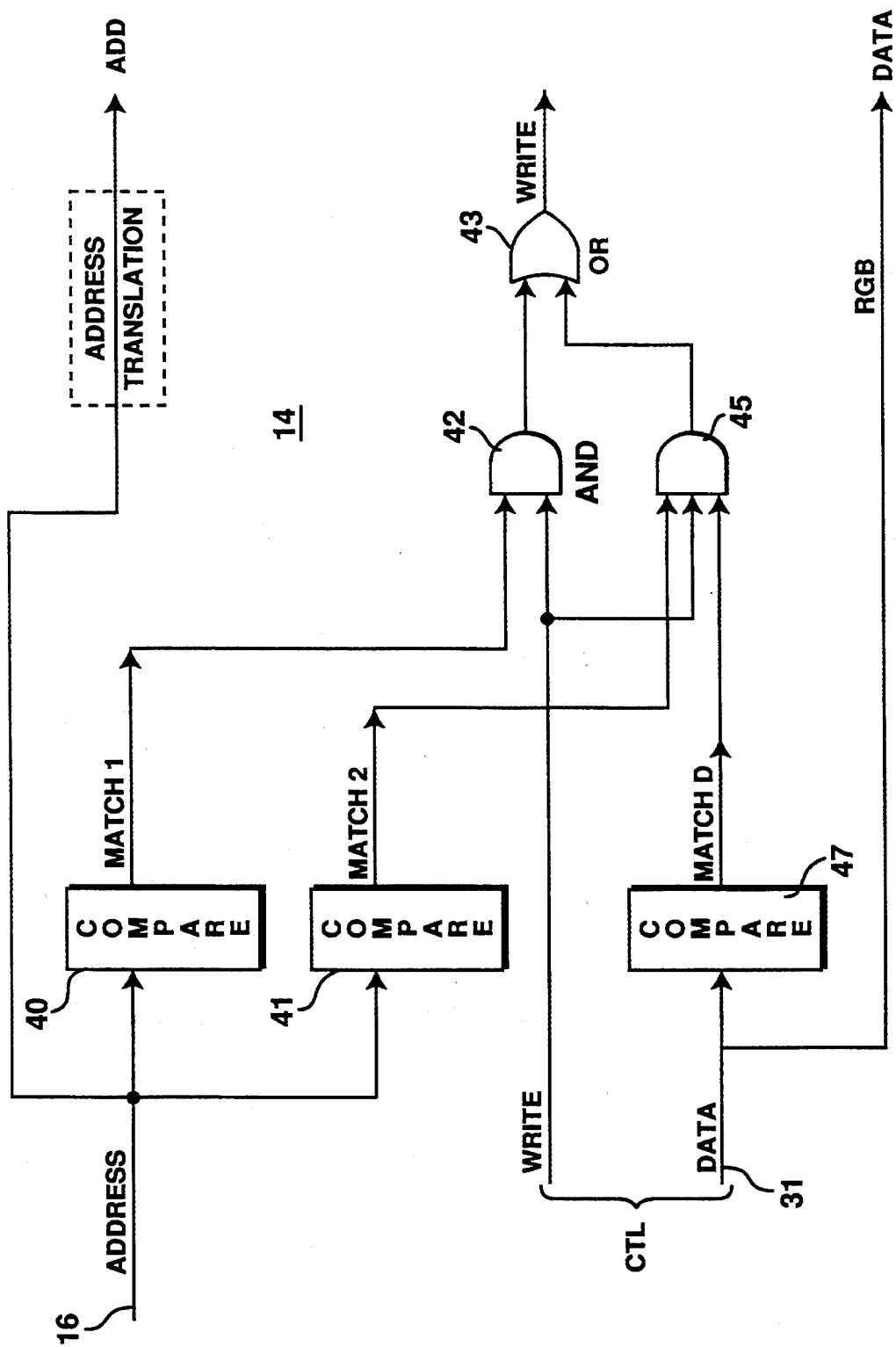

APPARATUS FOR PROVIDING DATA DEPENDENT WRITE OPERATIONS

This is a continuation of application Ser. No. 07/528,217, filed May 24, 1990 now abandoned.

BACKGROUND OF THE INVENTION

1. Field of the Invention

This invention relates to computer systems and, more particularly, to methods and apparatus for controlling writing operations in computer systems in a manner that the data transferred carries information concerning whether a write operation is to occur.

2. History of the Prior Art

In a typical computer system of the prior art, a central processing unit is connected to system memory by an address bus, a data bus, and various control lines. In order to accomplish a write operation, the central processing unit places an address on the address bus indicating the position to which data is to be written, places the data to be written on the data bus, and places control signals on the control lines indicating that a write operation is to occur. The system memory senses the address, determines that the address is one contained within its memory, and responds to the command by writing the data to the addressed position and signalling the central processing unit that the operation is complete.

This form of write operation is carried on throughout the typical computer system for all types of operations. When a write operation deals with a window various complications occur. For example, it is relatively easy to deal with rectangular windows which are to be presented on computer output displays, but it is very much more difficult to deal with other shapes of windows, especially with arbitrarily shaped windows. A central processing unit is capable of forming windows of arbitrary shapes and placing and manipulating data within the areas encompassed by such arbitrarily-shaped windows. A central processing unit is endowed with a great deal of power that may be easily manipulated under program control which allows it to accomplish such operations. However, many other devices which have direct memory access are not so capable and, consequently, are only able to deal with rectangular area. For example, devices called "blitters" used for moving blocks of information to relieve the central processing unit of repetitive graphics operations usually move only rectangular areas. Since such devices are constantly utilized, they become the limiting factor in what can be accomplished by the computer.

SUMMARY OF THE INVENTION

It is therefore, an object of the present invention to provide circuitry which allows arbitrary shapes to be provided by computer systems.

It is another object of the present invention to provide apparatus for varying the write operation so that the operation may be made dependant upon the content of the data to be written to an address so that devices usually capable of manipulating only rectangular areas may deal with arbitrarily-shaped areas on a computer output display.

It is another more specific object of the present invention to provide circuitry which utilizes data characteristics to determine the shape of a particular image to be presented on a computer output display.

These and other objects of the present invention are realized in a computer system which includes devices capable of writing data and generating addresses to which such data is to be written, a device to which data is directed, and address, data, and control lines connecting the devices capable of writing data and generating addresses to the device to which data is directed, apparatus for placing control signals in unused bit positions of data words, apparatus for sensing the control signals placed in the data words and apparatus responsive to the control signals placed in the data words for modifying the use made of the data.

These and other objects and features of the invention will be better understood by reference to the detailed description which follows taken together with the drawings in which like elements are referred to by like designations throughout the several views.

BRIEF DESCRIPTION OF THE DRAWINGS

FIG. 4 is a block diagram illustrating a second arrangement of a portion of the circuit illustrated in FIG. 2.

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

Figure 1:
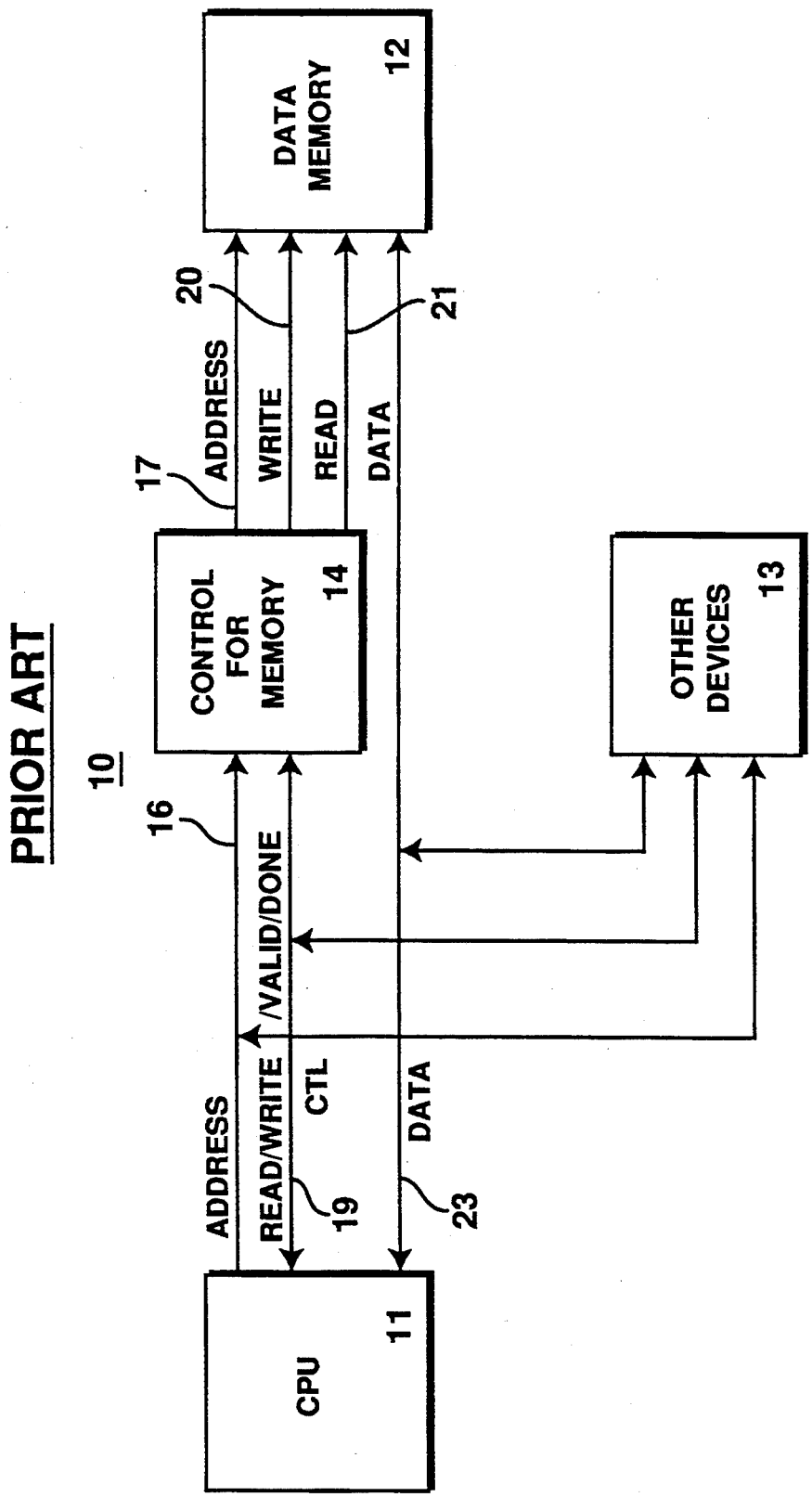
FIG. 1 is a block diagram illustrating a portion of a typical computer system of the prior art.

Referring now to FIG. 1 there is shown a portion of a typical computer system of the prior art. The system 10 includes a central processing unit 11, a data memory 12, one or more other devices 13 (illustrated as a single block for explanation purposes) which like the central processing unit 11 are capable of reading or writing to the memory 12. Associated with the data memory 12 is a memory control circuit 14.

In order to write data to the data memory 12, an address bus 16 joins the central processing unit 11, the other devices 13, and the memory control circuit 14. Address lines 17 continue from the memory control circuit 14 to the data memory 12. Commands are transferred from the central processing unit 11 to the memory control circuit 14 by command lines 19, and specific read and write commands are transferred from the memory control circuit 14 to the data memory 12 by read line 20 and write line 21. Data flows between the central processing unit 11 (and other devices 13) and the data memory 12 on a data bus 23.

When a write operation occurs in the system 10 illustrated in FIG. 1, an address is placed on the address bus 16 and a write command is placed on the control lines 19 to advise the memory control circuit 14 that a write to the data memory 12 is to occur; concurrently (or immediately after), the data is placed on the data bus 23 which connects directly to the data memory 12. The memory control circuit 14 senses that the address is within the range of addresses within the data memory 12, and the address (which may or may not be manipulated by the control circuitry) and the write command are directed to the data memory 12 on the address lines 17 and the write line 20. The data memory 12 takes the data on the data bus 23 and writes that data to the addressed position. It will be recognized that the data on the data bus 23 completely bypasses the memory control circuit 14 in the system 10, and that no use is made of that data other than to write it to data memory 12.

Figure 2:
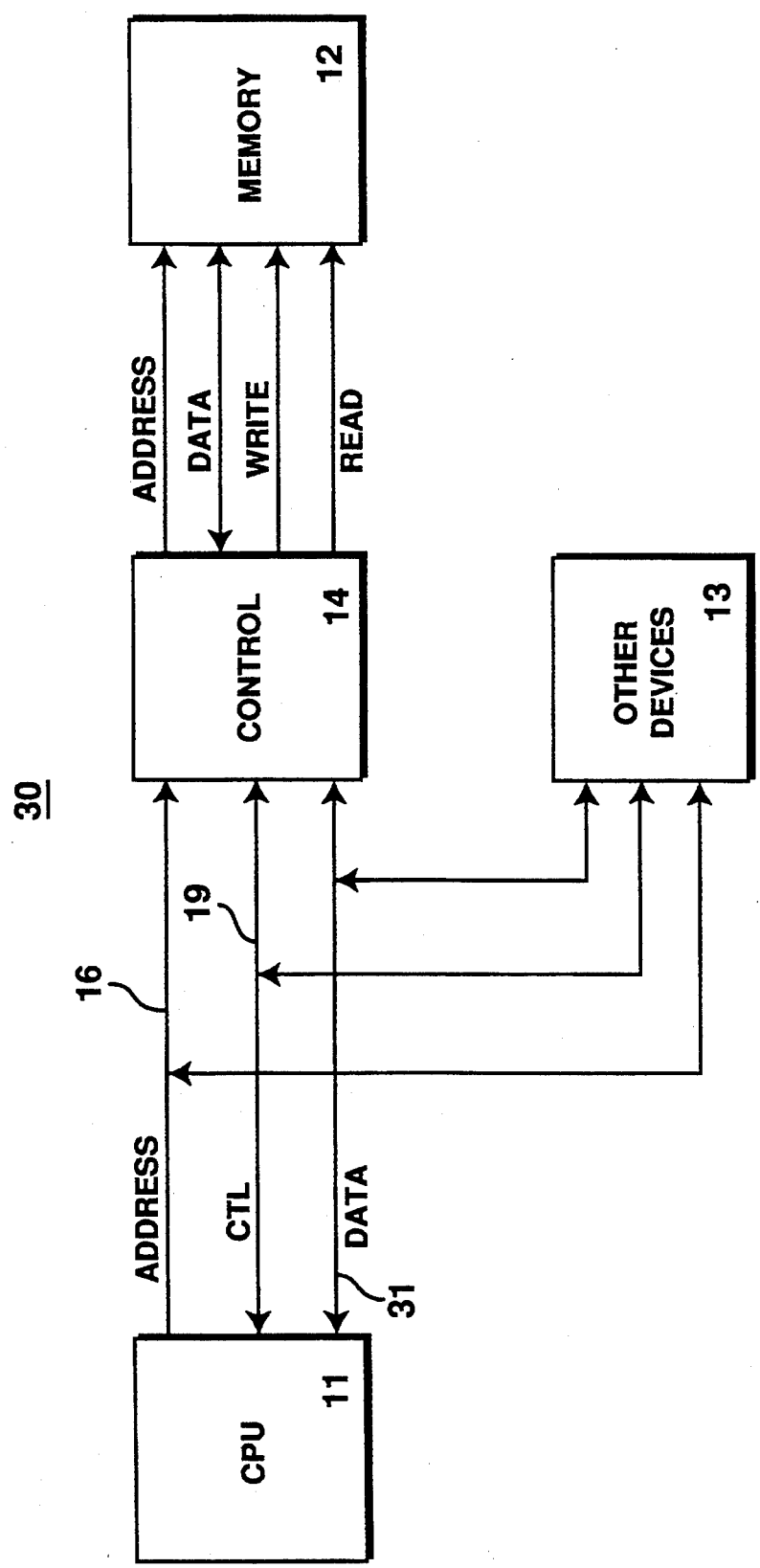
FIG. 2 is a block diagram illustrating a portion of a computer system constructed on accordance with the present invention.

FIG. 2 illustrates in block diagram form a system 30 constructed in accordance with the present invention. The system 30 includes a central processing unit 11, a data memory 12, a memory control circuit 14, and other devices 13 as does the system 10 of FIG. 1. However, where the central processing unit 11 and the other devices 13 of the system 10 are connected to the memory control circuit 14 by only the address bus 16 and the control lines 19 while the data bus 23 completely bypasses the memory control circuit 14 and continues directly to the data memory 12 in the circuit of FIG. 1, the central processing unit 11 and the other devices 13 of the system 30 are connected to the memory control circuit 14 by all of the address bus 16, the control lines 19, and the data bus 31. The address, control and data signals are then furnished to the data memory 12 for utilization. Since the data signals are furnished to the control circuitry those signals may be utilized for assisting in the control operation. In many formats, data signals include many presently unused bit positions. For example, a typical twenty-four bit color signal utilized in personal computers of the prior art is furnished as a part of a thirty-two bit word from the central processing unit to the data memory. The three red, green, and blue signals (utilizing eight bits each) use only twenty-four bits of the thirty-two bit space of the word leaving eight bits unused. This space is generally designated as alpha space and is generally free. In another format, eight bits of gray scale information and eight bits of alpha space make up a sixteen bit data format. By utilizing this bit space to convey control information, additional command over the operation of the computer system may be obtained.

A particularly useful manner in which these extra bits may be used is to control the writing of information to memory so that operations normally difficult for blitters for transferring large blocks of graphical information (represented by other devices 13) may be accomplished with ease. For example, as described above, it is quite difficult for these other devices 13 to provide windows of information to be displayed if it is desired that those windows be other than rectangles. Using the arrangement illustrated in FIG. 2, windows of arbitrary shapes may be easily attained. This is accomplished by providing in the data for any pixel to be written to memory an indication of whether that pixel is to be written or not. With such an indication, an entire rectangular area which includes the arbitrarily-shaped window of information may be directed to memory using the normal facilities of the system. As the data flows through the memory control circuit 14, the memory control circuit 14 looks at each individual pixel and determines whether that pixel (which would normally be written to memory) is in fact to be written.

For example, if it were desired to have an other device 13 write a circular window to frame buffer memory, a square including all of the pixels of the circle plus those pixels forming the corners of the square outside the circle would be directed by the other device 13 to be written in the memory 12. However, the central processing unit 11 would also have placed an indication in the alpha space of each pixel lying in the corners of the square outside the circle that the information was not to be written. The memory control circuit 14 would monitor each pixel of data on its way to the frame buffer memory and not write any pixel including the indication "don't write" in its alpha space. In this manner, a circular window would be stored in the frame buffer and ultimately presented on the computer output display.

Figure 3:
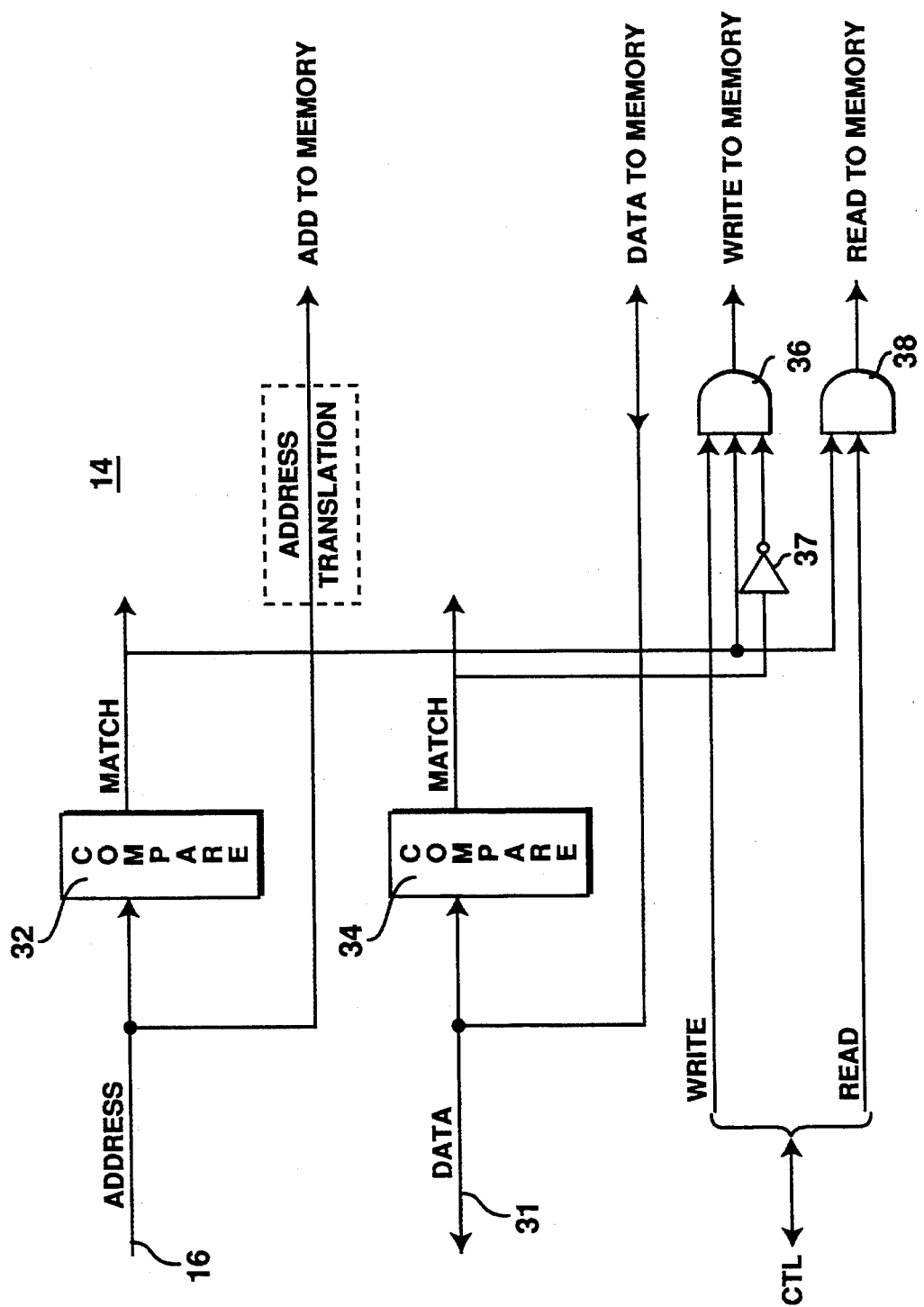
FIG. 3 is a block diagram illustrating a portion of the circuit illustrated in FIG. 2.

FIG. 3 is a detailed block diagram of a first embodiment of the memory control circuitry 14 used in implementing the present invention. The circuitry 14 includes first and second comparator circuits 32 and 34 which receive the address and data signals on the address bus 16 and the data bus 31, respectively. The comparator 32 compares the address placed on the address bus 16 with the range of addresses within the memory 12 and provides a match signal when the address is within the memory 12 so that the memory is apprised that the operation is to take place within the memory 12. The address is simultaneously furnished to the memory addressing circuitry (not shown) of the memory 12.

The data signal appearing on the data bus 31 is reviewed by the comparator 34 to determine whether an indication is contained within the alpha byte of the particular pixel being handled to indicate that the pixel is to be written to memory. Presuming that there is a match indicating that a write is to take place, an indication of the match is transferred to a first AND gate 36. In the circuit 14 of FIG. 3, the match indication is transferred by an inverter 37 because in the preferred embodiment, the match comparison is a zero value signal.

Simultaneously, the actual red/green/blue portion of the data signal is transferred to the memory circuit 12 so that it may be written to the addressed portion of memory 12.

The coincidence of a write signal on the control lines 19, an address match signal, and a data write comparison signal at the AND gate 36 generates a write signal which is transferred to the memory circuit 12 to accomplish the write operation at the addressed position. The lack of a match comparison at the comparator 34 causes a write signal at an addressed position within the memory circuit 12 to be ignored since the AND gate 36 does not propagate the write signal to the memory circuit 12. This facility allows portions of a rectangular window, for example, to be ignored when writing to the memory 12 so that arbitrary window shapes may be created.

The memory control circuit 14 includes a second AND circuit 38 which provides a read signal to the memory circuit 12 in the presence of simultaneous read and address match signals for accomplishing the memory read operation.

FIG. 4 is a detailed block diagram of a second embodiment of the memory control circuitry 14 used in implementing the present invention. The circuit 14 includes a pair of comparator circuits 40 and 41 each of which receive the address furnished on the address bus 16. The comparator 40 compares the address of the bus 16 with the range of addresses available within the memory 12 and furnishes a match signal when the address is within its range. The match signal is furnished to an AND gate 42 along with a write signal on the command lines to provide a write signal which may be propagated by an OR gate 43 to cause the address to be selected for data appearing on the data lines. It will be noted that this addressing channel provides no ability to select by means of the data content whether or not information is to be written to the memory 12.

On the other hand, the comparator 41 receives the same address information on the address bus 16, generates a match signal when the address is within its selected range, but provides its match signal to an AND gate 45. The ranges of addresses for which the two compare circuits 40 and 41 provide match signals are typically different. The AND gate 45 also receives a write input signal from the command lines and a signal from a comparator 47. The comparator 47 receives the data on the data bus 31 and tests for the presence of a write indication within the alpha portion of the data word so that the address may be written only when that write indication is included in the individual pixel. This provides the facility by which the write operation may be made to depend upon the content of the data.

The memory control circuit 14 of FIG. 4 is thus able to allow the arbitrarily-shaped windows to be produced when utilized with the frame buffer and also allows different address ranges within a particular memory to be selectively used with the data dependant write facility.

Although the present invention has been described in terms of a preferred embodiment, it will be appreciated that various modifications and alterations might be made by those skilled in the art without departing from the spirit and scope of the invention. For example, as pointed out above, signals other than twenty-four bit RGB color may also contain unused bits which may be utilized as herein taught to transfer control signals. Moreover, there may be many situations in which it is desirable to make operations other than those described dependant upon the content of the data involved. The invention should therefore be measured in terms of the claims which follow.

What is claimed is:

1. In a computer system for generating a display of images on a display screen, an apparatus comprising:
    a processor for placing control data within unused words of pixel information, wherein said pixel information comprises a series of groups of data words and wherein said control data defines how individual data words of said groups of data words are to be used, said pixel information for generating images on said display screen;
    a control circuit coupled to receive said pixel information, said control circuit for sensing said control data placed in said pixel information and for generating a separate control signal in response to, and associated with, each group of data words within said pixel information; and
    a memory unit coupled to receive said control signals from said control circuit and coupled to receive from said pixel information, said memory unit for storing a particular group of data words only if said control signal associated with said particular group of data words indicates that said particular group of data words should be stored, and wherein images displayed on said display screen are generated based on information stored within said memory unit.

2. An apparatus as described in claim 1 wherein said memory unit is also for ignoring said particular group of data words if said control signal associated with said particular group of data words indicates that said particular group of data words should not be stored.

3. An apparatus as described in claim 1 wherein said processor is also for generating addressing information associated with each group of data words within said series of groups of data words, said addressing information indicating addresses within said memory unit for storage of said pixel information and wherein said memory unit is coupled to receive said addressing information.

4. An apparatus as described in claim 1 wherein each group of data words of said series of groups of data words of said pixel information represents color information for a pixel of said display screen including red, green, and blue information and wherein said unused words of said pixel information represent an alpha word.

5. An apparatus in claim 1 wherein said pixel information represents gray scale information.

6. An apparatus as described in claim 1 wherein said control circuit includes a comparator for comparing said control data of said pixel information against a reference control data signal.

7. An apparatus as described in claim 1 wherein said control signal is a write signal.

8. An apparatus as described in claim 1 wherein said memory unit is a frame buffer.

9. In a computer system for generating a display of images on a display screen, an apparatus comprising:
    processor means for placing control data within unused words of pixel information, wherein said pixel information comprises a series of groups of data words and wherein said control data defines how individual data words of said groups of data words are to be used, said pixel information for generating images on said display screen;

sensing means coupled to receive said pixel information and for sensing said control data placed in said pixel information and also for generating a separate control signal in response to, and associated with, each group of data words within said pixel information; and memory means coupled to receive control signals from said sensing means and coupled to receive said pixel information, said memory means for storing a particular group of data words only if said control signal associated with said particular group of data words indicates that said particular group of data words should be stored, and wherein images displayed on said display screen are generated based on information stored within said memory means.

10. An apparatus as described in claim 9 wherein said memory means is also for ignoring said particular group of data words if said control signal associated with said particular group of data words indicates that said particular group of data words should not be stored.

11. An apparatus as described in claim 9 wherein said processor means is also for generating addressing information associated with each group of data words within said series of groups of data words, said addressing information indicating addresses for storage of said pixel information within said memory means and wherein said memory means is coupled to receive said addressing information.

12. An apparatus as described in claim 9 wherein each group of data words of said series of groups of data words of said pixel information represents color information for a pixel of said display screen including red, green, and blue information and wherein said unused words of said pixel information represent an alpha word.

13. An apparatus in claim 9 wherein said pixel information represents gray scale information.

14. An apparatus as described in claim 9 wherein said sensing means includes a comparator for comparing said control data of said pixel information against a reference control data signal.

15. An apparatus as described in claim 9 wherein said control signal is a write signal.

16. An apparatus as described in claim 9 wherein said memory means is a frame buffer memory unit.

17. In a computer system for generating a display of images on a display screen, an apparatus comprising:

a processor for placing control data within unused words of a first pixel information, wherein said first pixel information comprises plurality of groups of data words and wherein said control data defines how individual data words of said groups of data words are to be used, a portion of said first pixel information for generating images on said display screen;

a control circuit coupled to receive said first pixel information, said control circuit for sensing said control data placed in said first pixel information and for generating a separate control signal in response to, and associated with, each group of data words within said first pixel information; and a memory unit for receiving control signals from said control circuit and for receiving said first pixel information, said memory unit for storing a second pixel information, said second pixel information being said portion of said first pixel information, said memory unit responsive to said control signals and for storing a particular group of data words only if a control signal associated with said particular group of data words indicates that said particular group of data words should be stored, and wherein images displayed on said display screen are generated based on information stored within said memory unit.

18. An apparatus as described in claim 17 wherein said processor is also for generating addressing information associated with each group of data words within said plurality of groups of data words, said addressing information indicating addresses for storage of said pixel information within said memory unit and wherein said memory unit is coupled to receive said addressing information.

19. An apparatus as described in claim 18 wherein said first pixel information addresses an area of said memory unit that is rectangular in shape when displayed on said display screen.

20. An apparatus as described in claim 19 wherein said second pixel information addresses an area of said memory unit that is not rectangular in shape when displayed on said display screen.

21. An apparatus as described in claim 17 wherein said memory unit is also for ignoring said particular group of data words if said control signal indicates that said particular group of data words should not be stored.

22. An apparatus as described in claim 17 wherein each group of data words of said plurality of groups of data words of said pixel information represents color information for a pixel of said display screen including red, green, and blue information and wherein said unused words of said first pixel information represent an alpha word.

23. An apparatus as described in claim 17 wherein said control circuit includes a comparator for comparing said control data of said first pixel information against a reference control signal.

24. An apparatus as described in claim 17 wherein said control signal is a write signal and wherein said memory unit is a frame buffer.

* * * * *